United States Patent
Azulay et al.

(10) Patent No.: US 10,922,388 B2
(45) Date of Patent: Feb. 16, 2021

(54) SESSION CONTROL FOR CLIENT-SIDE APPLICATIONS IN PROXY SOLUTIONS

(71) Applicant: Microsoft Technology Licensing, LLC, Redmond, WA (US)

(72) Inventors: Itamar Azulay, Mishmar Ayyalon (IL); Yossi Haber, Ganei Tikva (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 145 days.

(21) Appl. No.: 16/199,973

(22) Filed: Nov. 26, 2018

(65) Prior Publication Data
US 2020/0167446 A1 May 28, 2020

(51) Int. Cl.
| | |
|---|---|
| G06F 21/50 | (2013.01) |
| G06F 21/54 | (2013.01) |
| G06F 21/12 | (2013.01) |
| G06F 21/55 | (2013.01) |
| H04L 29/06 | (2006.01) |
| H04L 29/08 | (2006.01) |
| G06F 16/955 | (2019.01) |
| G06F 11/34 | (2006.01) |
| G06F 40/14 | (2020.01) |
| G06F 40/154 | (2020.01) |

(Continued)

(52) U.S. Cl.
CPC ........ *G06F 21/125* (2013.01); *G06F 11/3438* (2013.01); *G06F 16/955* (2019.01); *G06F 21/128* (2013.01); *G06F 21/54* (2013.01); *G06F 21/554* (2013.01); *G06F 40/14* (2020.01); *G06F 40/154* (2020.01); *G06F 40/166* (2020.01); *H04L 63/20* (2013.01); *H04L 67/14* (2013.01); *H04L 67/28* (2013.01); *G06F 2201/86* (2013.01); *G06F 2221/2123* (2013.01)

(58) Field of Classification Search
None
See application file for complete search history.

(56) References Cited

U.S. PATENT DOCUMENTS

| | | | |
|---|---|---|---|
| 9,326,189 B2 * | 4/2016 | Luna | H04W 28/06 |
| 2018/0039501 A1 * | 2/2018 | Jain | G06F 9/451 |
| 2020/0097506 A1 * | 3/2020 | Kephart | G06F 16/9532 |

OTHER PUBLICATIONS

Understanding and Monitoring Embedded Web Scripts. Zhou et al. IEEE. (Year: 2015).*

(Continued)

*Primary Examiner* — Venkat Perungavoor
(74) *Attorney, Agent, or Firm* — Newport IP, LLC; Michael C. Johnson

(57) ABSTRACT

Methods, systems, and media are shown for session control by a proxy service of client-side applications in a client. A service request from a client is received by the proxy service and forwarded to a service provider, which sends a service response with a document. Event monitoring code is injected into the document and the response is forwarded to the client. The event monitoring code intercepts a user action and sends a query to the proxy service to determine whether the user action is permitted. The proxy service checks the user action against access data defined for the document and sends a query response to the event monitoring code indicating whether the user action is permitted. If the user action is permitted, the event monitoring code allows normal execution flow. If the user action is denied, the code blocks further execution.

20 Claims, 11 Drawing Sheets

(51) Int. Cl.
*G06F 40/166* (2020.01)
*G06F 21/62* (2013.01)

(56) References Cited

OTHER PUBLICATIONS

Architectures for Inlining Security Monitors in Web Applications. Magazinius et al. LNCS. (Year: 2014).*
CN 110083459. Ping an Urban-Tech. (Year: 2019).*

* cited by examiner

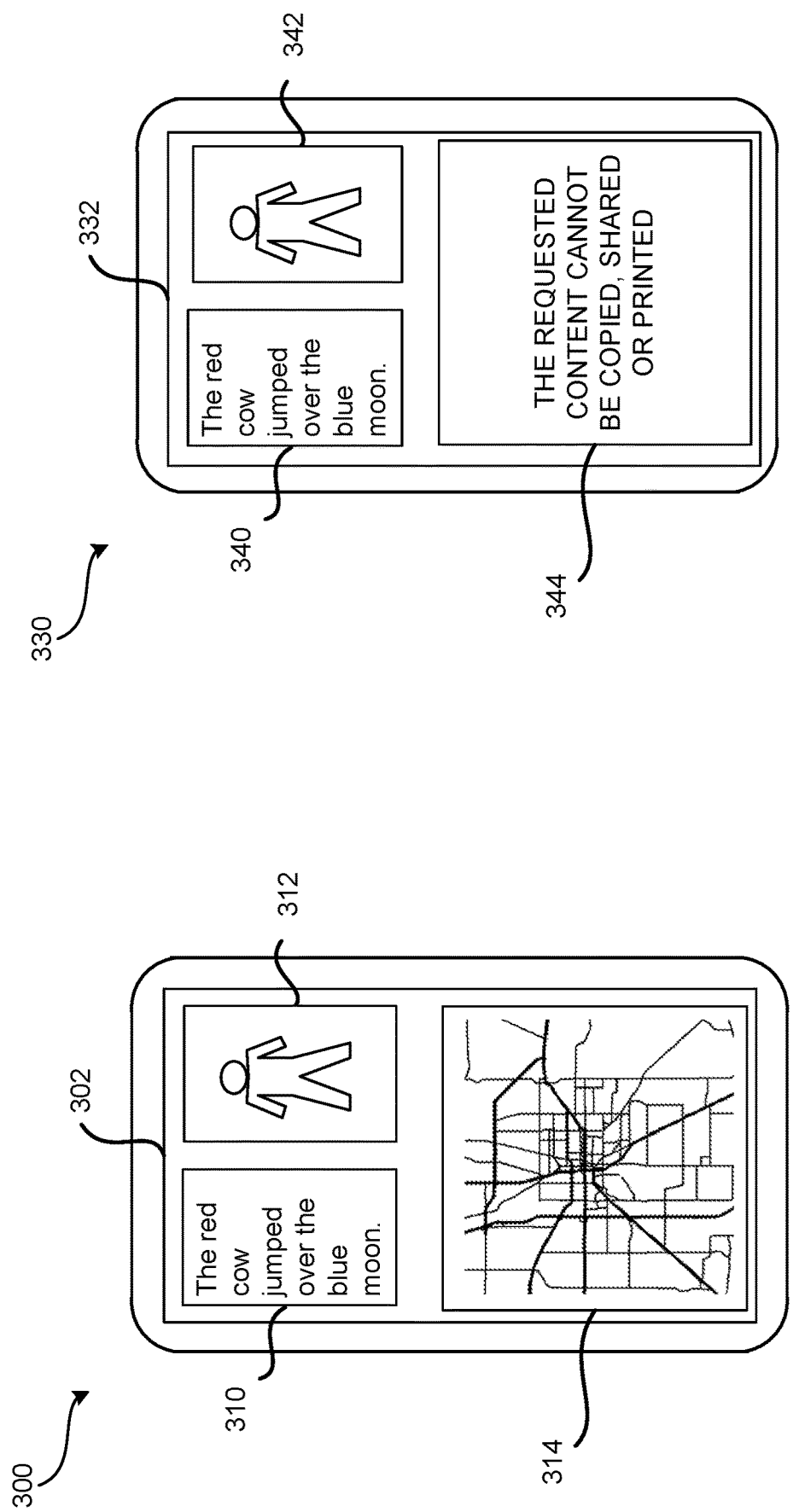

US 10,922,388 B2

SESSION CONTROL FOR CLIENT-SIDE APPLICATIONS IN PROXY SOLUTIONS

BACKGROUND

In networked computer systems, proxy services are sometimes used to monitor internet traffic and enforce policy restrictions on user activities. However, when a user of a client device uses a client-side application that executes on the client, e.g. a browser application or word processing application, the proxy service may be unable to monitor the activities undertaken by the user using the client-side application.

For example, a browser application can be used by a user to print or save a document, such as a web page or document file. If the user submits a print request, e.g. ctrl-p, the proxy service cannot detect the user action and cannot apply policy rules, such as use policies defined by an administrator of a tenant domain. As a result, the user is able to perform actions that the administrator sought to prevent in defining the policy rules.

It is with respect to these and other technical challenges that the disclosure made herein is presented.

SUMMARY

It is advantageous to apply policy rules defined for a document or domain. However, policies enforced by a proxy service may be unable to detect actions taken by a user on a client utilizing a client-side application on the client. The disclosed technology provides a solution that permits a proxy service to monitor user actions involving a client-side application on the client and apply policy rules, e.g. session control, to the user actions.

In certain aspects of the disclosed technology, generally speaking, a proxy service injects event monitoring code into a document requested by a client from a service provider. The event monitoring code executes on the client and intercepts user actions with respect to the document. The event monitoring code forwards information regarding the user action to the proxy service, which obtains access data for the document that defines the user actions that are permitted or restricted for the document.

The proxy service sends a message to the event monitoring code indicating whether the user action is permitted or prohibited. If the user action is permitted, the event monitoring code on the client allows normal execution flow for the user action to proceed. If the user action is prohibited, the event monitoring code on the client blocks the execution flow for the user action. In some implementations, the event monitoring code notifies the user that the user action is prohibited. In other implementations, the event monitoring code obscures all or part of the content of the document.

In order to realize the technical benefits mentioned briefly above, certain implementations of the technologies disclosed herein can perform session control by a proxy service of client-side applications in a client that involves receiving a service request from a client, sending the service request to a service provider, and receiving a service response from the service provider that includes a document responsive to the service request. The disclosed technology further involves injecting into the document event monitoring code for monitoring user actions on the client and sending the service response with the document and event monitoring code to the client. Disclosed technology also involves receiving a query message from the event monitoring code with data identifying a user request for action and the client-side application used by the user and searching for access data pertaining to the document. If access data pertaining to the document is found that indicates that the user request for action and the client-side application used by the user is permitted, then a query response is sent to the event monitoring code with information indicating that the user request for action is permitted. If no access data pertaining to the document is found that indicates that the user request for action and the client-side application used by the user is permitted, the query response is sent to the event monitoring code with information indicating that the user request for action is not permitted.

In some implementations, if no access data pertaining to the document is found that indicates that the application and user request for action is not permitted, the event monitoring code is configured to generate a message for display on a user interface of the client indicating that the user request is denied or obscure at least a portion of content in the document in the client. In certain examples, the user request for action can be a navigation action, a print action, a read action, an edit action, or a send action. In other examples, the access data can be an entry corresponding to each client-side applications with definitions for permitted user actions for each application.

In certain other examples, the event monitoring code for monitoring user actions for the document on the client includes code for intercepting a user request for action for the document on the client, sending the query message to the proxy service with data identifying the user request for action and a client-side application used by the user, and receiving the query response from the proxy service. If the query response indicates that the user request for action is permitted, the event monitoring code allows normal execute flow for the user request for action. If the query response indicates that the user request for action is not permitted, the event monitoring code blocks execution flow for the user request for action.

In a particular implementation, the event monitoring code for monitoring user actions on the client is composed of an event listener before and after a monitored action. The event monitoring code for blocking execution flow for the user request for action is composed of code for adding a text element with predetermined text to the Document Object Model (DOM) for the document and adding a Cascading Style Sheet (CSS) element to the DOM with media that applies to the user request for action that is configured to hide at least one element of the document.

In another particular implementation, the event monitoring code for monitoring user actions on the client is composed of code for checking whether a navigation Universal Resource Locator (URL) to which a user is navigating matches a client-side application URL scheme. The event monitoring code for blocking execution flow for the user request for action is composed of code for replacing the navigation URL with a dummy URL that maintains a user in a current view page for the document.

As discussed briefly above, implementations of the technologies disclosed herein enable session control by a proxy service to be applied to client-side applications to prevent documents from being compromised or corrupted. This leads to improved security for documents even when the documents are accessible by a client. The ability to maintain session control of documents on clients enables documents to be made more widely available to users without compromising security, which will result in higher availability and efficiency of computer resources for users of computer systems. Other technical benefits not specifically identified herein can also be realized through implementations of the disclosed technologies.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3A is a schematic diagram showing an illustrative example of user interface in a client device for displaying document content;

FIG. 3B is a schematic diagram showing an illustrative example of a user interface in a client device where a user request for action regarding displayed content is blocked and the content obscured in accordance with certain aspects of the disclosed technology;

DETAILED DESCRIPTION

Figure 1:
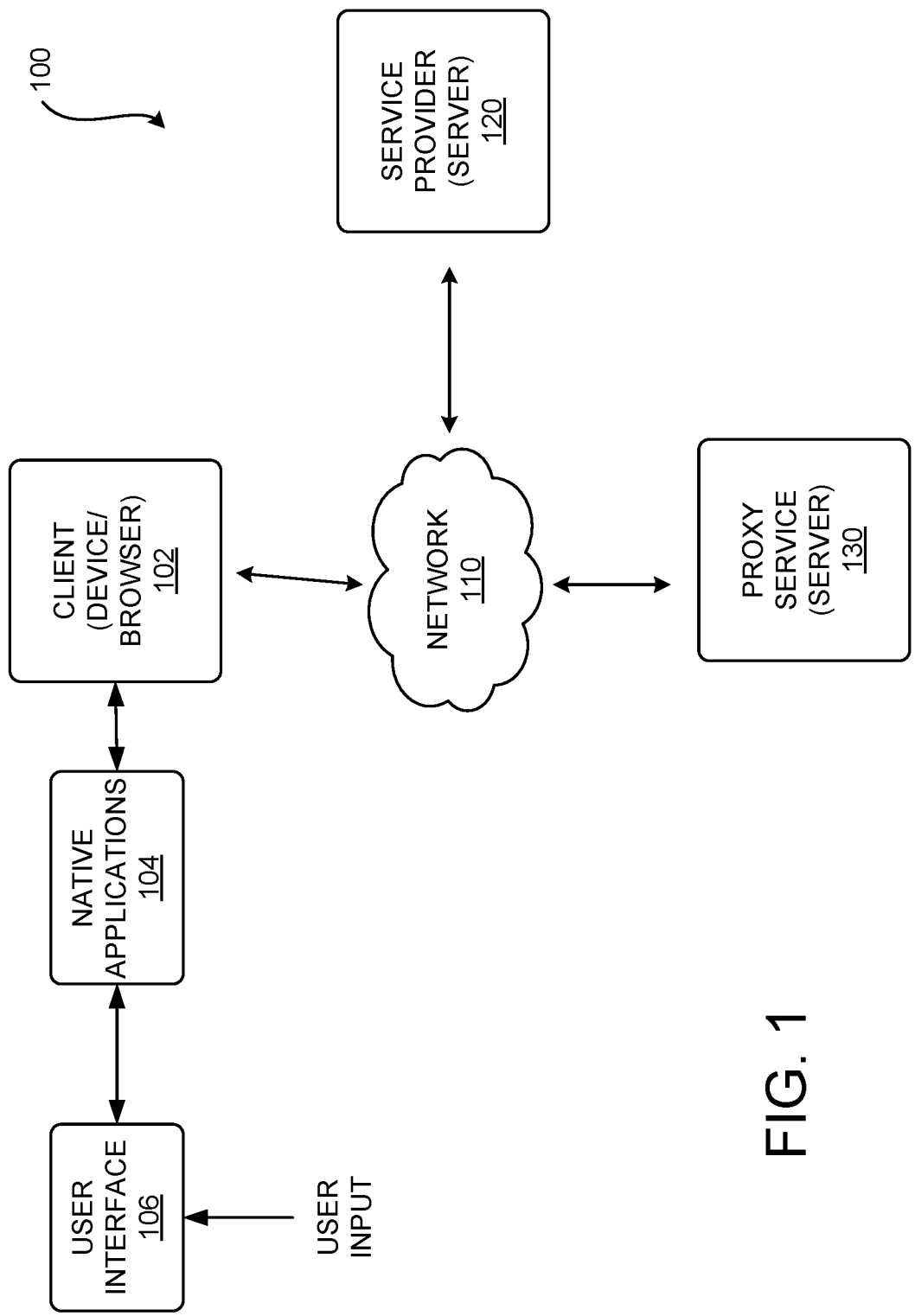
FIG. 1 is a network architecture diagram showing an illustrative example of a networked computing environment involving a client device, a service provider and a proxy service.

The following detailed description is directed to an approach for session control by a proxy service for client-side applications on a client. As discussed briefly above, the application of policy rules defined for a domain is advantageous to an administrator of the domain to prevent inappropriate actions by a user, e.g. actions that can create liability for the domain owner or compromise the security of systems or data.

However, session control by a proxy service can be generally incompatible with access to content, such as a document or page, by client-side applications on a client. The proxy service typically does not have access to the session interactions with a document of a client-side application in a client. Therefore, the proxy service cannot maintain session control of the document in the client, which can result in a user performing actions with respect to the document that would otherwise be blocked if session control is available. Because the proxy service is unable to maintain session control over the document, a user of a client-side application in a client can obtain undesirable access to the client, such as editing, copying or printing sensitive content.

In general terms, implementations of the disclosed technology can enable session control by a proxy service of client-side applications in a client. A service request from a client is received by the proxy service and forwarded to a service provider, which sends a service response with a document. Event monitoring code is injected into the document and the response is forwarded to the client. The event monitoring code intercepts a user action and sends a query to the proxy service to determine whether the user action is permitted. The proxy service checks the user action against access data defined for the document and sends a query response to the event monitoring code indicating whether the user action is permitted. If the user action is permitted, the event monitoring code allows normal execution flow. If the user action is denied, the code blocks further execution.

The disclosed technology improves computer security by enabling a proxy service to maintain session control over documents in a client that can be accessed using a client-side application on the client.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable customer electronics, computing or processing systems embedded in devices (such as wearables, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several figures, aspects of session control in a proxy service for client-side applications that provides improved security will be described.

FIG. 1 is a network architecture diagram showing an illustrative example of a network computing environment 100 involving a client device 102 in communication with service provider 120 and proxy service 130 through network 110. Client device 102 can be a device, such as a personal computer or a smart phone, that a user utilizes to access resources through the network, such as services provided by service provider 120, and can utilize a client-side application 104 through user interface 106.

Service provider 120 supports services and content that can be accessed by client 102 through proxy service 130 via network 110. When client 102 attempts to access services and content on service provider 120, the access is routed through proxy service 130, which monitors the message traffic between client 102 and service provider 120.

Figure 2A:
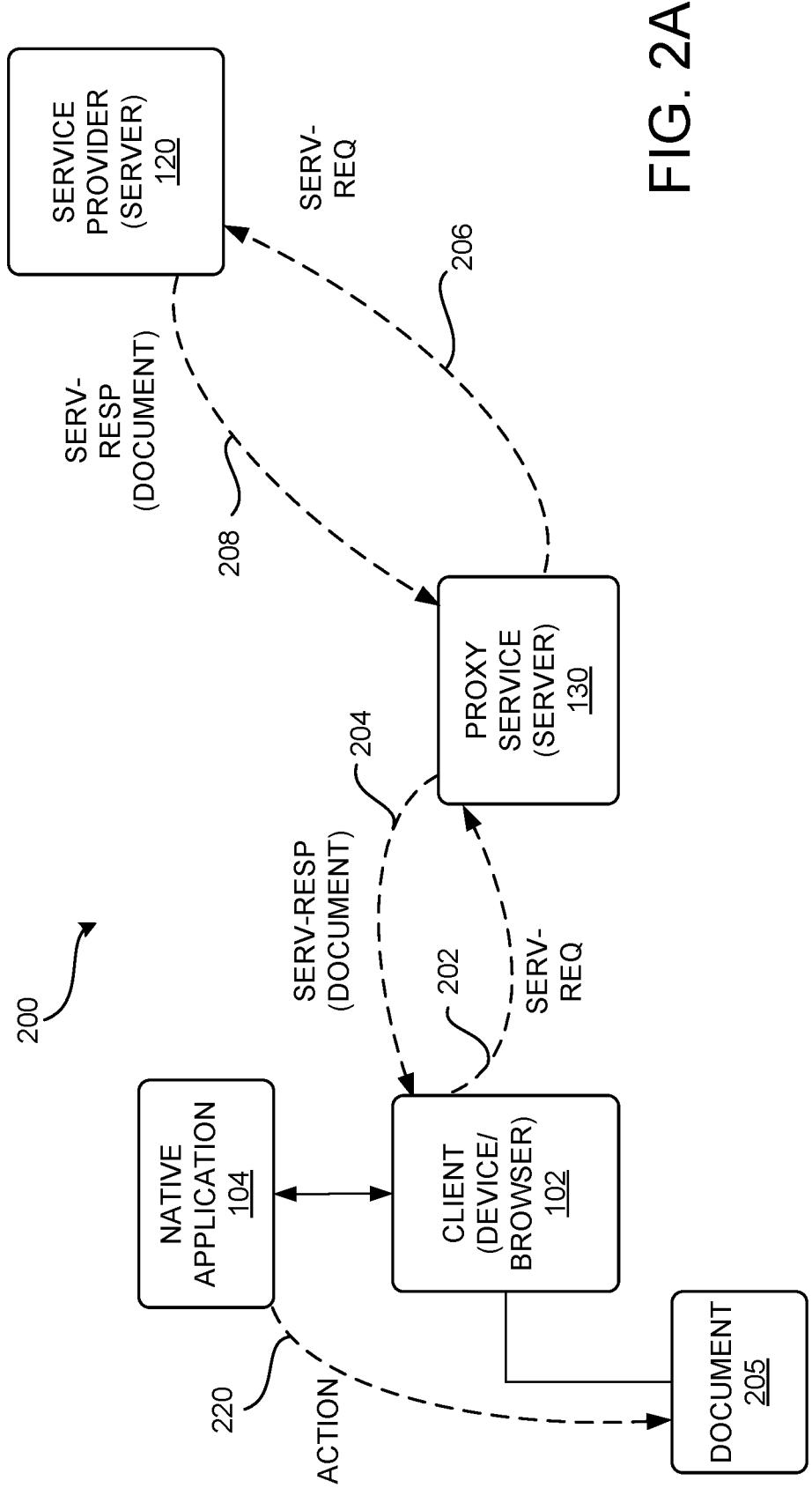
FIG. 2A is a software architecture diagram showing an illustrative example of a conventional exchange of messages between a client device, a service provider and a proxy service, where a client-side application on the client takes an action with respect to a document.

FIG. 2A is a software architecture diagram that illustrates a simplified example of a conventional exchange of messages 200 between client device 102 and service provider 120 through proxy service 130. In this example, at 202, client 102 sends a service request, e.g. a Universal Resource Locator (URL), to service provider 120. Proxy service 130 receives the service request and forwards the request to service provider 120, at 206. Service provider 120 generates a service response to the service request, e.g. a document referenced by the URL, and sends the service response to proxy service 130, at 208.

At 204, proxy service 130 forwards the service response with the document to client 102, which stores the document 205 on the client. Using client-side application 104, a user is able to undertake an action 220 on document 205. However, because action 220 and document 205 reside on client 102, proxy service 130 is unable to detect action 220 and apply session control rules, e.g. policies, to the user action. Consequently, a user utilizing client-side application 104 can take undesirable actions with respect to the document 205 without proxy service 130 having the capability to control the user's actions.

Figure 2B:
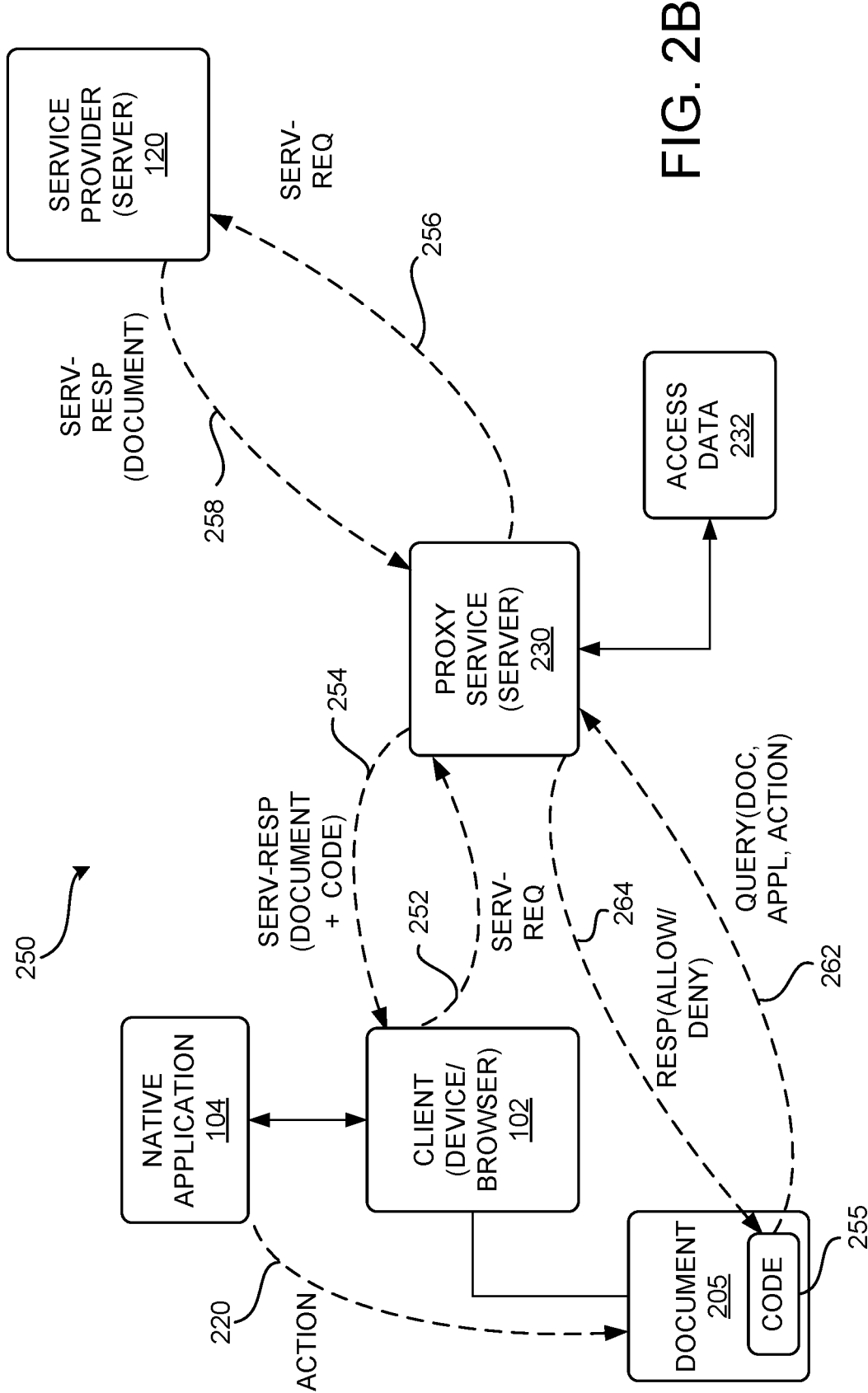
FIG. 2B is a software architecture diagram showing an illustrative example of an exchange of messages between a client device, a service provider and a proxy service in accordance with the disclosed technology.

FIG. 2B is a software architecture diagram showing an illustrative example of an exchange of messages 250 between client device 102 and service provider 120 utilizing proxy service 230, which is configured to operate in accordance with aspects of the disclosed technology. Similar to the scenario of FIG. 2A, in this example, at 252, client 102 sends a service request, e.g. a Universal Resource Locator (URL), to service provider 120. Proxy service 230 receives the service request and forwards the request to service provider 120, at 256. Service provider 120 generates a service response to the service request, e.g. a document referenced by the URL, and sends the service response to proxy service 230, at 258.

Proxy service 230 injects event monitoring code into the document received at 258 and, at 254, forwards the document with the injected code to client 102. Client 102 stores the document 205 locally along with the injected event monitoring code 255. The event monitoring code 255 intercepts action 220 from client-side application 104 and forwards a query to proxy service 230 with information identifying the document, the application and the action.

Proxy service 230 receives the query from event monitoring code 255 and searches access data 232 for policy data pertaining to the document. The proxy service 230 checks the application and action against the policy data found for the document to determine whether action 220 using application 104 is permitted. Proxy service 230 sends response 264 to the event monitoring code 255 in client 102 with an indication as to whether the user requested action 220 is permitted or denied.

As discussed further below, the event monitoring code 255 can allow normal execution flow to proceed for action 220 if response 264 indicates that the action is permitted. If the action is indicated as denied in response 264, event monitoring code 255 blocks normal execution flow for action 220. In certain implementations, event monitoring code 255 can obscure the document from display in client 102 or provide a notification to the user indicating that the user requested action 220 is prohibited.

The disclosed technology provides an approach whereby a proxy service can extend session control to documents on a client even when a user utilizes client-side applications residing on the client to access the document. The disclosed technology is implemented in the proxy service without generally requiring modifications to the client or service provider. As a result, for example, the disclosed technology can be implemented to permit a tenant administrator to extend session control to client's utilizing client-side applications.

FIG. 3A is a schematic diagram showing an illustrative example of user interface 302 in a client device 300 for displaying document content. In this example, content is rendered by a browser and displayed in display regions 310, 312 and 314 of user interface 302. In the example shown, text is shown in display region 310, a photograph is shown in display area 312, and graphical data shown in display area 314. Each display region can represent the rendered content for a specific document, e.g. a web page, or for different portions of a document.

In a conventional approach, a proxy server would be generally unable to prevent a user from performing an action on the document displayed on user interface 302 using a client-side application, such as the browser rendering the content. As a result, for example, a user might edit, copy or print the content illustrated, in this example, in display region 314 even if policy rules were defined for the domain corresponding to client 300 to prevent such actions with respect to the content of the document or documents on client 300.

FIG. 3B is a schematic diagram showing an illustrative example of a user interface 332 in a client 330 where a user request for action regarding displayed content is blocked and the content obscured in accordance with certain aspects of the disclosed technology. In the example shown, event monitoring code has been injected by a proxy service into a document on client 330 that can be accessed utilizing a client-side application on client 330. The event monitoring code intercepts user actions using the client-side application and enables policy rules to be applied to the actions requested by the user using the client-side application.

In this example, an action is requested by the user for document content corresponding to display region 344. As described above, event monitoring code intercepts a user action requested for the document content and sends a query to a proxy service with information indicating the document, application and action. In this example, the proxy service returns a response indicating that the requested user action is denied. The event monitoring code obscures the content in display region 344 and outputs a message in display region 344 to the user indicating that the requested user action is prohibited.

Note that while the scenarios described herein reference a nonce, such as the nonce provided for in the OpenID protocol, the concepts described can be applied to other scenarios wherein a unique session identifier value is generated and utilized to prevent replay attacks. Similarly, while the scenarios described herein reference authentication tokens, the concepts described herein can be applied to other scenarios wherein other forms of identity authentication data is utilized by an identity provider to indicate that a client's user credentials have been authenticated.

Figure 4:
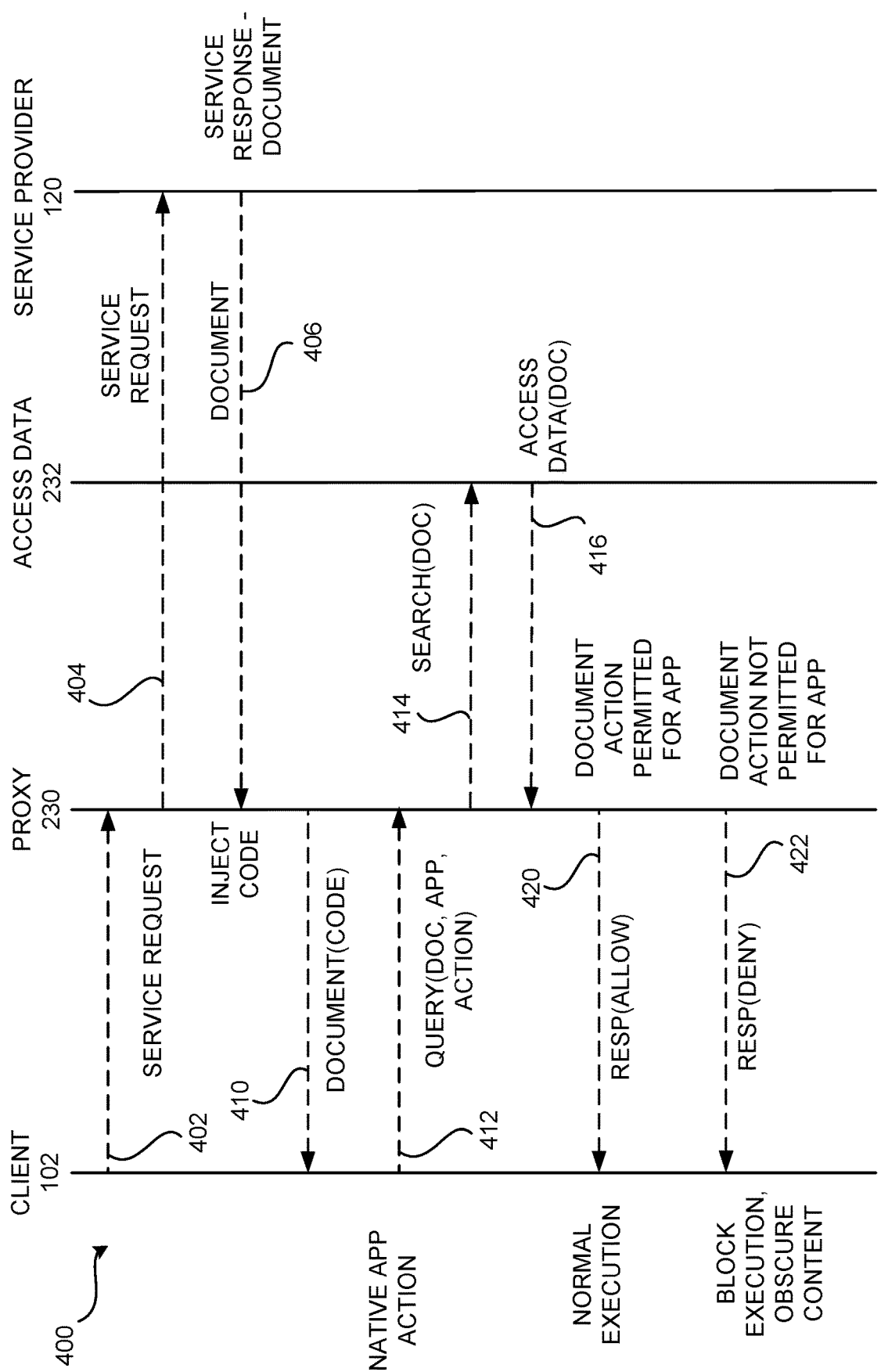
FIG. 4 is a messaging diagram showing an illustration of message transfer between a client device, a service provider and a proxy service in accordance with the disclosed technology.

FIG. 4 is a messaging diagram showing an illustration of message transfer scenario 400 showing a sequence of messages between client device 102 and service provider 120 through proxy service 230 for extending session control to client-side applications on a client in accordance with the disclosed technology as discussed above with respect to FIGS. 2B and 3B.

At 402, client device 102 initiates a service request to service provider 120, e.g. a URL for a document, through proxy service 230. At 404, proxy service 230 forwards the service request to service provider 120. In response, service provider 120 obtains a document responsive to the service request and sends the document in response 406 to proxy service 230. Proxy service 230 injects event monitoring code into the document received from service provider 120 and forwards the document with the injected code to client 102 at 410. The document with the injected code is stored on client 102 where it can be accessed by a client-side application on client 102.

A user utilizing a client-side application on client 102 initiates a user action with respect to the document stored on client 102, which causes execution of the event monitoring code injected in the document. The event monitoring code intercepts the user action, halts normal execution flow for the action, and, at 412, sends a query to proxy service 230 with information identifying the document, the application, and the action.

Responsive to query 412, proxy service 230 searches access data 232, at 414, and retrieves, at 416, policy information pertaining to the document, e.g. permitted applications and actions defined for the document. Proxy service 230 determines whether the requested user action is permitted based on the access data for the document.

If the requested user action is permitted, a response indicating that the action is permitted is sent to the event monitoring code in client 102 at 420. The event monitoring code responds to the indication that the action is permitted by allowing normal execution flow for the requested user action to continue.

If the requested user action is not permitted, a response indicating that the action is denied is sent to the event monitoring code in client 102 at 422. The event monitoring code responds to the indication that the action is denied by blocking further execution flow for the requested user action. The event monitoring code can, in some implementations, prevent content from the document from being viewable on client 102. The event monitoring code can also, in some implementations, generate a message viewable on client 102 to the user indicating that the requested user action is prohibited.

It will be appreciated that the architecture and messaging shown in the examples associated with FIGS. 2B and 4 are illustrative and do not limit the scope of the disclosed technology. One of skill in the art will readily recognize that other architectures and message protocols may be utilized in keeping with the disclosed technology.

Further note that alternative implementations are possible without departing from the scope of the disclosed technology. For example, access data for a document can permit or deny all user actions for a particular application. In another example, the access data can be based on rules defined for a domain of which the user is a member. In still other examples, the access data can be defined for groups or classes of documents. Also, while the term "document" is used herein to mean an HTTP document, such a document can comprise or include a variety of content, such as text, images and graphics. One of ordinary skill in the art will appreciate that the disclosed technology generally provides an effective approach to session control by a proxy service over applications in a client.

Figure 5A:
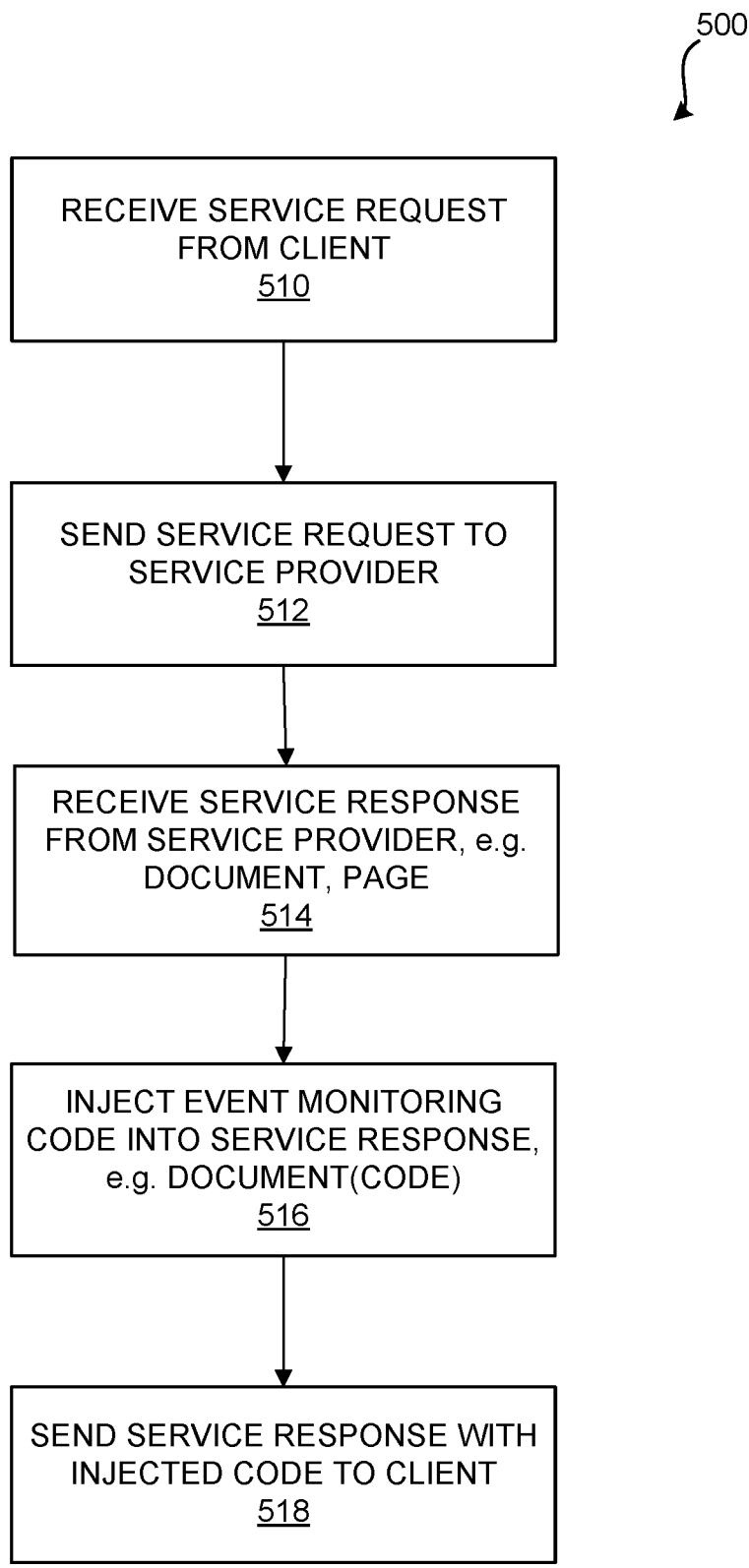
FIG. 5A is a flow diagram showing an illustrative example of a process in a proxy service in accordance with the disclosed technology, where event monitoring code is injected into a document from the service provider and sent to the client device in accordance with the disclosed technology.
Figure 5B:
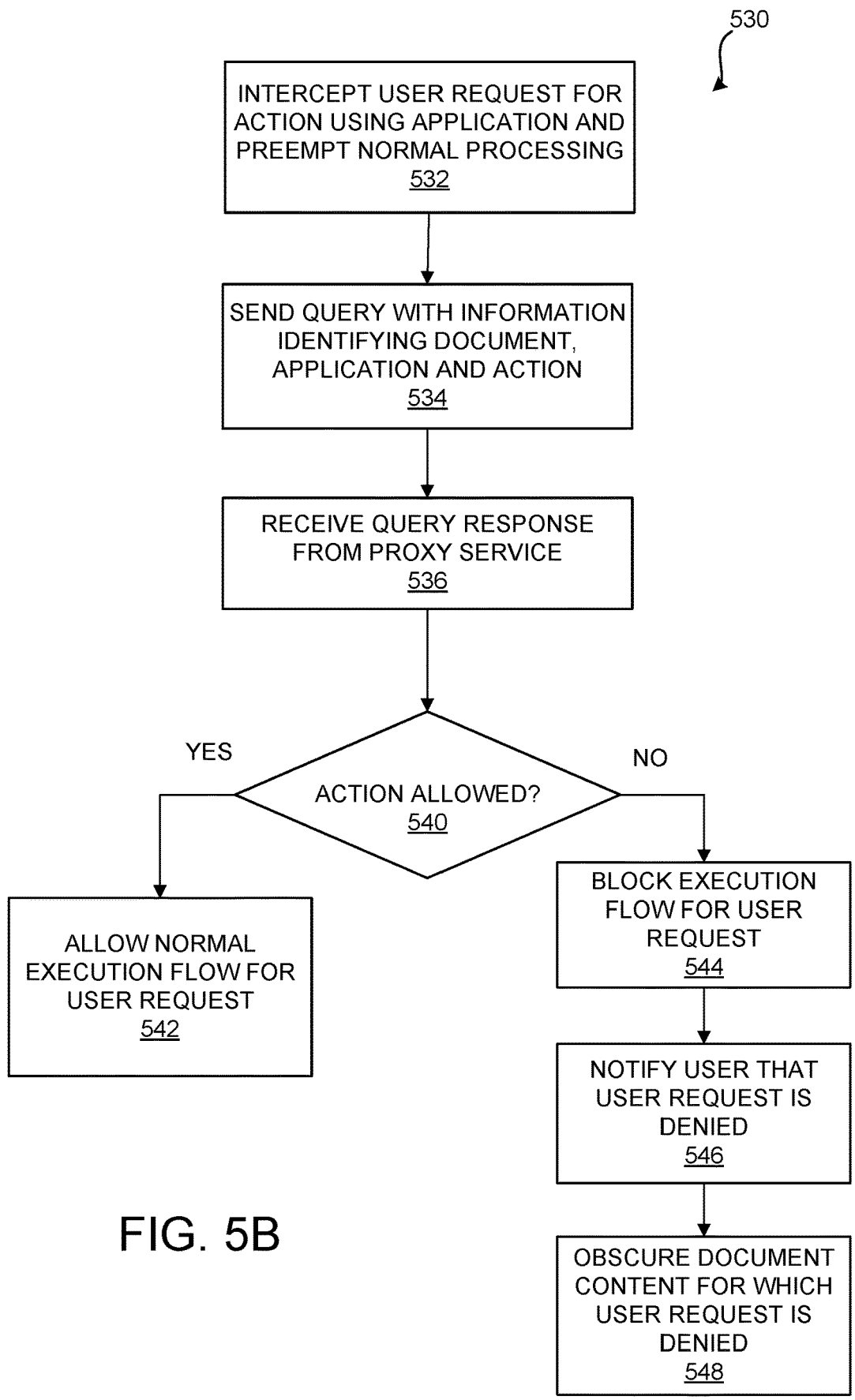
FIG. 5B is a flow diagram showing an illustrative example of a process in a client device for event monitoring code injected into a document, where the event monitoring code intercepts a user request for an application action and provides for session control with respect to the document in accordance with the disclosed technology.
Figure 5C:
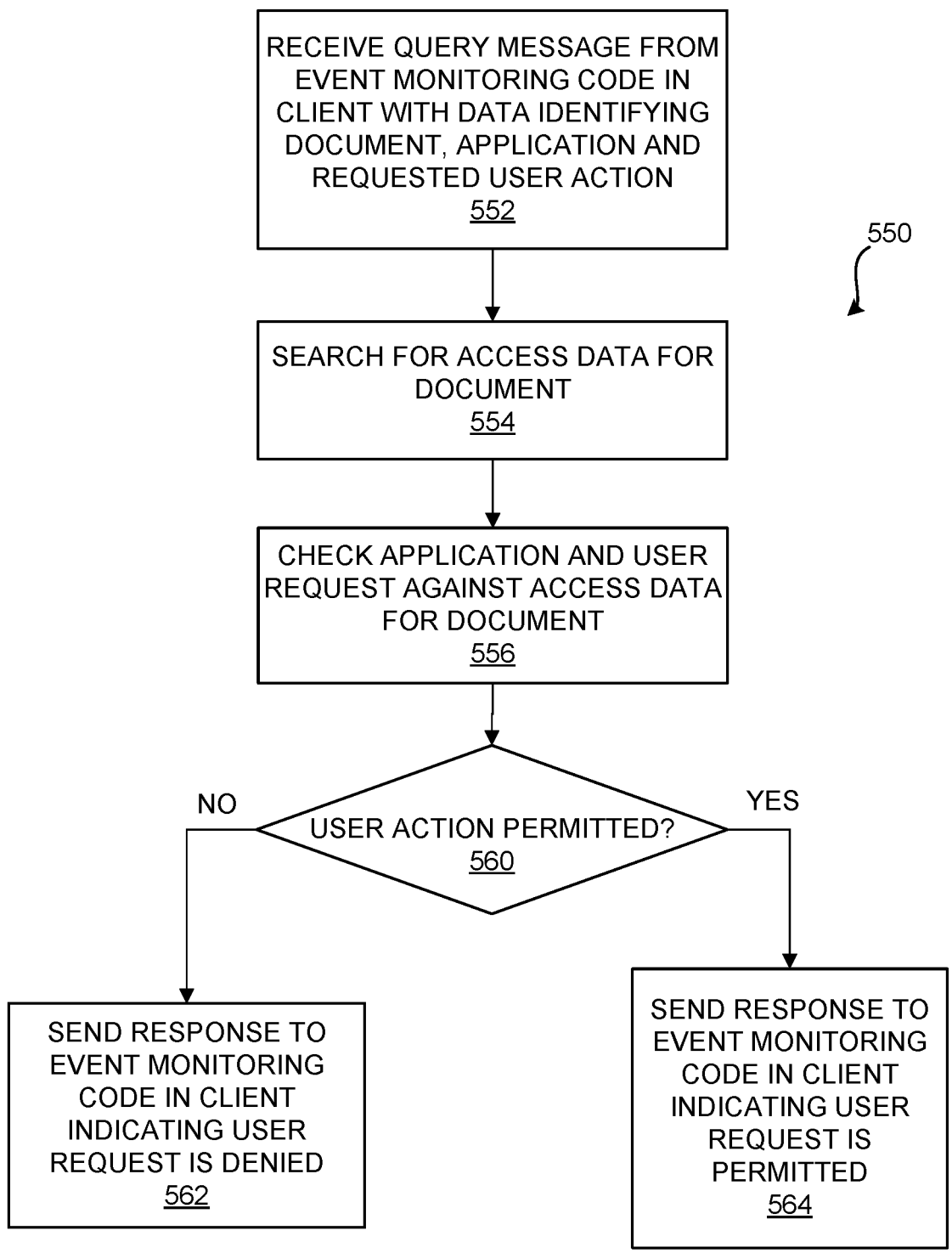
FIG. 5C is a flow diagram showing an illustrative example of a process in the proxy service for performing session control in the client with respect to the document in accordance with the disclosed technology.

FIGS. 5A-C are flow diagrams showing an illustrative example of processes executing in client 102 and proxy service 230 in accordance with certain aspects of the disclosed technology. Note that the disclosed technology generally does not require changes to code in the client and service provider. The processes in proxy service 230 in accordance with the disclosed technology are generally sufficient to implement the disclosed approach to maintaining session control by a proxy service over client-side applications in a client. The process 530 in FIG. 5B is generally the result of the client executing event monitoring code injected by the proxy service in the course of normal operation of the client.

FIG. 5A is a flow diagram showing an illustrative example of a process 500 in a proxy service in accordance with the disclosed technology. The processes shown assume that a proxy service has been established with regard to a client to receive and relay communications between the client and a service provider.

In the example of FIG. 5A, a proxy service injects event monitoring code into a document received from a service provider in response to a request from a client and forwards the document with the injected event monitoring code to the client. At 510, a proxy service, such as proxy service 230 of FIG. 2B, receives a service request from a client, such as client 102 of FIG. 2B. For example, the service request can be an HTTP request with a URL referencing content on a service provider. At 512, the proxy service forwards the service request to a service provider, such as service provider 120 in FIG. 2B.

At 514, the proxy service receives a service response from the service provider with a document, such as an HTML document or page. At 516, the proxy service injects event monitoring code into the received document. At 518, the proxy service sends the document with the injected event monitoring code to the client.

The event monitoring code injected into the document injects one or more decision points in the document to achieve visibility over user client-side action. The injected decision points are generally synchronous and preemptive in order to obtain input from a proxy service with the user's client-side action is completed.

FIG. 5B is a flow diagram showing an illustrative example of a process 530 in a client for event monitoring code injected into a document, where the event monitoring code intercepts a user request for an application action and provides for session control with respect to the document in accordance with the disclosed technology.

At 532, the event monitoring code intercepts a user request for an action using an application on the client and preempts normal processing of the requested user action. At 534, the event monitoring code queries the proxy service with information identifying the document, application and user requested action.

The event monitoring code waits to receive a response to the query from the proxy service, which is received at 536. If the response to the query indicates that the user requested action is permitted, control branches at 540 to 542, where the event monitoring code allows normal execution flow to continue for the user requested action.

If the response to the query indicates that the user requested action is not permitted, then control branches at 540 to 544 to block further execution flow for the user requested action. Thus, the user is prevented from completing a prohibited action with respect to the document in the client.

In some optional implementations, control can continue to 546 to generate a notification to the user that the user requested action is denied, such as the message indicated in display area 344 of FIG. 3B. Also, in some optional implementations, control can continue to 548 to obscure display of the content for which the user attempted to a prohibited action, as also illustrated in the contrast between display area 314 of FIG. 3A and display area 344 of FIG. 3B.

In one example of general client-side policy session control, the event monitoring code includes a decision point injected into the document before an action is performed. When the user requests the action, the decision point is triggered, which preempts execution flow. The event monitoring code sends a synchronous XmlHttpRequest, e.g. xhr, to the proxy service with current data regarding the action that is requested.

The proxy service responds to the XmlHllpRequest with a status code that the event monitoring code can interpret with respect to the user requested action. For example, if the status code is "403—Unauthorized", then the event monitoring code interprets the response to indicate that the user requested action is prohibited and blocks further execution flow for the user requested action. If the status code received from the proxy service is "202—Accepted", then the event monitoring code interprets the response to indicate that the user requested action is permitted and allow normal execution flow for the user requested action to continue.

FIG. 5C is a flow diagram showing an illustrative example of a process 550 in a proxy service for performing session control for a document in a client along with event monitoring code injected into the document in accordance with the disclosed technology. In this example, process 550 interacts with the event monitoring code process 530 of FIG. 5B to apply access policy rules to user actions with respect to a document on the client.

At 552, the proxy service receives a query message from the event monitoring code in the client with data identifying the document, application and requested user action, such as the query sent at 534 in event monitoring code process 530. At 554, the proxy service searches for access data, e.g. policy rules, pertaining to the document. At 556, the application and requested user action are checked against access data for the document.

If the access data indicates that the user action is not permitted, control branches at 560 to 562 to send a response to the event monitoring code in the client that indicates that the user request is denied. If the access data indicates that the user action is permitted, then control branches at 560 to 564 to send a response to the event monitoring code in the client that indicates that the user request is permitted. The event monitoring code acts upon the response from process 550 as described above.

One example of a scenario for an application of the disclosed technology involves asserting a client-side print policy for when a user attempts to print a page, e.g. a document. In this scenario, a user utilizes a browser client application to view a web page, e.g. document, and enters Ctrl+P to initiate a print action with respect to the page.

The event monitoring code includes an event listener on each document in a current window of the browser client application, e.g. each iframe or html document, that runs before and after a print action. When the user enters Ctrl+P for a print action, an event listener intercepts the requested user action and sends a query to the proxy service to obtain a determination on whether the print action is permitted for the document. If a response from the proxy service indicates that the print action is permitted, then normal execution flow continues for the print action.

If the response from the proxy service indicates that the print action is not permitted, then, in this example, a text element with the text "Print Restricted—This page cannot be printed" is added to the Document Object Model (DOM) for the document. A Cascading Style Sheet (CSS) element is also added to the DOM with media attribute set to "print" so that it applies to prints and that is configured to hide at least one element of the document, e.g. obscure the element from being visible to the user.

The added text element, however, is visible to the user. The user can also be informed that the requested action is blocked using a notification in the user interface. The print preview window displayed for the print action shows a blank page with the text from the text element displayed. When the print preview window is closed, an "after-print" event can be called to remove the text element and CSS element from the DOM, so that the document can be printed by the user in the future if the print policy for the document changes.

Another example of a scenario for application of the disclosed technology involves asserting policy for a client-side application. In this scenario, a document management service, such as MICROSOFT SHAREPOINT, enables a user to view a docx document on the user's client. The document management service allows a user to open the document in a word processing application on the client, such as MICROSOFT WORD. Opening the document in the native word processing application takes the document out of session control, which can expose a sensitive document to risk.

In this scenario, event monitoring code is injected into the document that checks, e.g. using REGEX, whether a URL that a user is navigating to matches a client-side application URL scheme. The navigation action is intercepted by the event monitoring code, which queries the proxy service to determine if the navigation action is permitted.

If the server provides a response indicating that the navigation action is permitted, then the event monitoring code allows normal execution flow to continue for the navigation action.

If the server provides a response indicating that the navigation action is not permitted, then the event monitoring code replaces the navigation URL with a "#" dummy URL. The dummy URL will fulfill the navigation request, but will keep the user in the current view page without exiting the session control provided by the document management service. The user can be informed about the navigation action being blocked using a notification displayed on the user interface of the client.

One of skill in the art will readily appreciate that a variety of approaches may be utilized for session control in a proxy service for client-side applications in a client without departing from the scope of the disclosed technology. The approach of the disclosed technology enables policy rules to be applied in a client even when a client-side application is utilized by a user to request an action, which improves the security and control of documents and clients.

It is to be appreciated that while the embodiments disclosed herein have been presented primarily in the context of performing session control in a proxy service for client-side applications in a client. The technologies disclosed herein can be similarly applied to other contexts where similar functionality is utilized to perform session control for client-side applications in a client.

Figure 6:
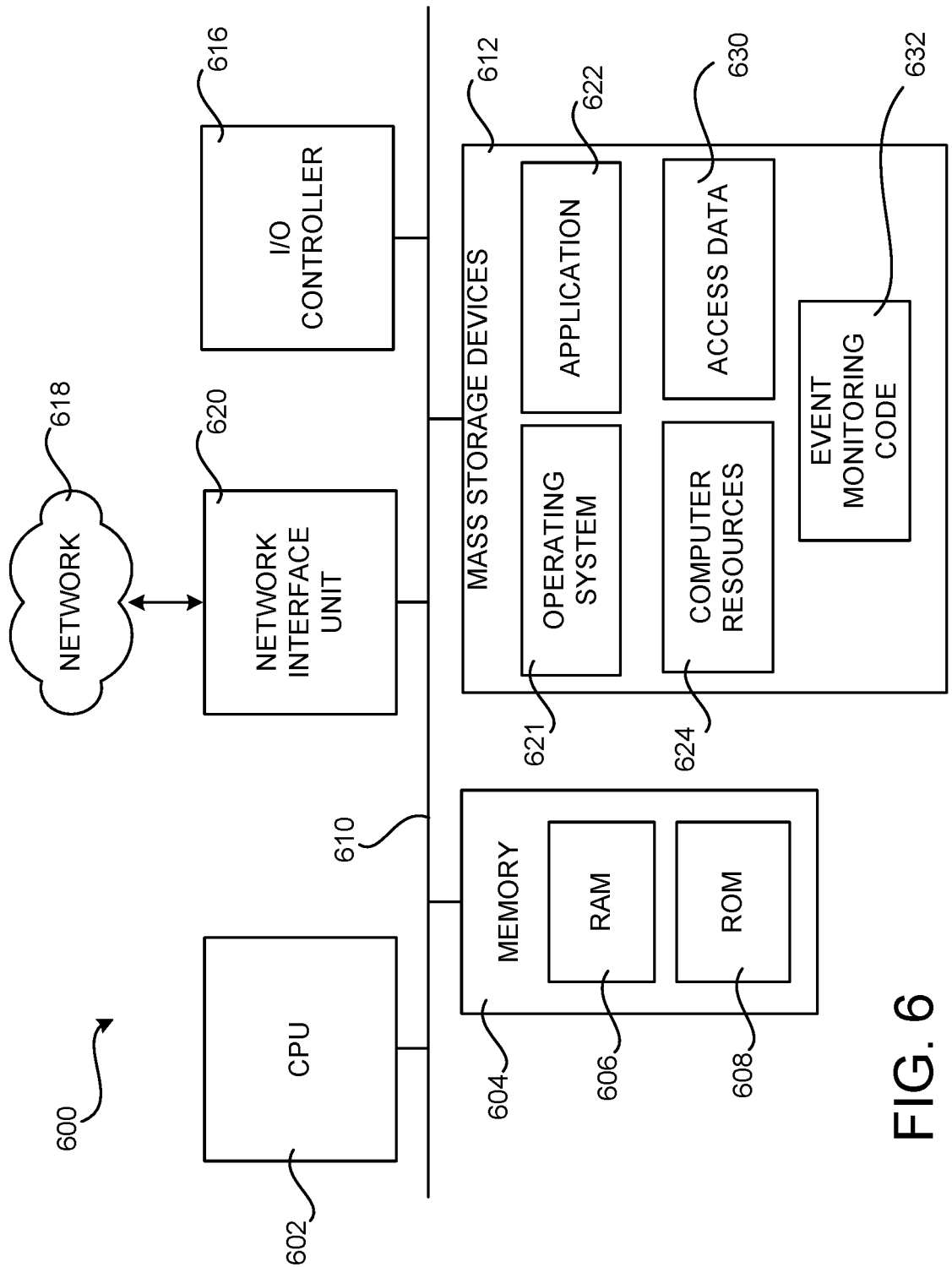
FIG. 6 is a computer architecture diagram showing an illustrative computer hardware and software architecture for a computing device, such as the computing devices shown in FIGS. 1, 2A and 2B, that can implement aspects of the technologies presented herein.

FIG. 6 is a computer architecture diagram that shows an architecture for a computer 600 capable of executing the software components described herein. The architecture illustrated in FIG. 6 is an architecture for a server computer, mobile phone, an e-reader, a smartphone, a desktop computer, a netbook computer, a tablet computer, a laptop computer, or another type of computing device suitable for executing the software components presented herein.

In this regard, it should be appreciated that the computer 600 shown in FIG. 6 can be utilized to implement a computing device capable of executing any of the software components presented herein. For example, and without limitation, the computing architecture described with reference to FIG. 6 can be utilized to implement the client 102, proxy service 230, and service provider 120 illustrated in the system 250 of FIG. 2B, which is capable of executing the various software components described above, such as the operations of the processes illustrated in FIGS. 5A-F.

The computer 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system ("BIOS" or "firmware") containing the basic routines that help to transfer information between elements within the computer 600, such as during startup, is stored in the ROM 608. The computer 600 further includes one or more mass storage devices 612 for storing an operating system 621, application programs 622, and other types of programs and data including, but not limited to, the computer resources 624, access data 630 and event monitoring code 632. The computer resources 624, access data 630 and event monitoring code can be stored in a different storage device from one another.

The mass storage device 612 is connected to the CPU 602 through a mass storage controller (not shown) connected to the bus 610. The mass storage device 612 and its associated computer readable media provide non-volatile storage for the computer 600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer executable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 600. For purposes of the claims, the phrase "computer storage medium," and variations thereof, does not include waves or signals per se or communication media.

According to various configurations, the computer 600 can operate in a networked environment using logical connections to remote computers through a network such as the network 618. The computer 600 can connect to the network 618 through a network interface unit 620 connected to the bus 610. It should be appreciated that the network interface unit 620 can also be utilized to connect to other types of networks and remote computer systems. The computer 600 can also include an input/output controller 616 for receiving and processing input from a number of other devices, including a keyboard, mouse, touch input, or electronic stylus (not shown in FIG. 6). Similarly, the input/output controller 616 can provide output to a display screen or other type of output device (also not shown in FIG. 6).

It should be appreciated that the software components described herein, when loaded into the CPU 602 and executed, can transform the CPU 602 and the overall computer 600 from a general-purpose computing device into a special-purpose computing device customized to facilitate the functionality presented herein. The CPU 602 can be constructed from any number of transistors or other discrete circuit elements, which can individually or collectively assume any number of states. More specifically, the CPU 602 can operate as a finite-state machine, in response to executable instructions contained within the software modules disclosed herein. These computer executable instructions can transform the CPU 602 by specifying how the CPU 602 transitions between states, thereby transforming the transistors or other discrete hardware elements constituting the CPU 602.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 600 in order to store and execute the software components presented herein. It also should be appreciated that the architecture shown in FIG. 6 for the computer 600, or a similar architecture, can be utilized to implement other types of computing devices, including hand-held computers, video game devices, embedded computer systems, mobile devices such as smartphones and tablets, and other types of computing devices known to those skilled in the art. It is also contemplated that the computer 600 might not include all of the components shown in FIG. 6, can include other components that are not explicitly shown in FIG. 6, or can utilize an architecture completely different than that shown in FIG. 6.

Figure 7:
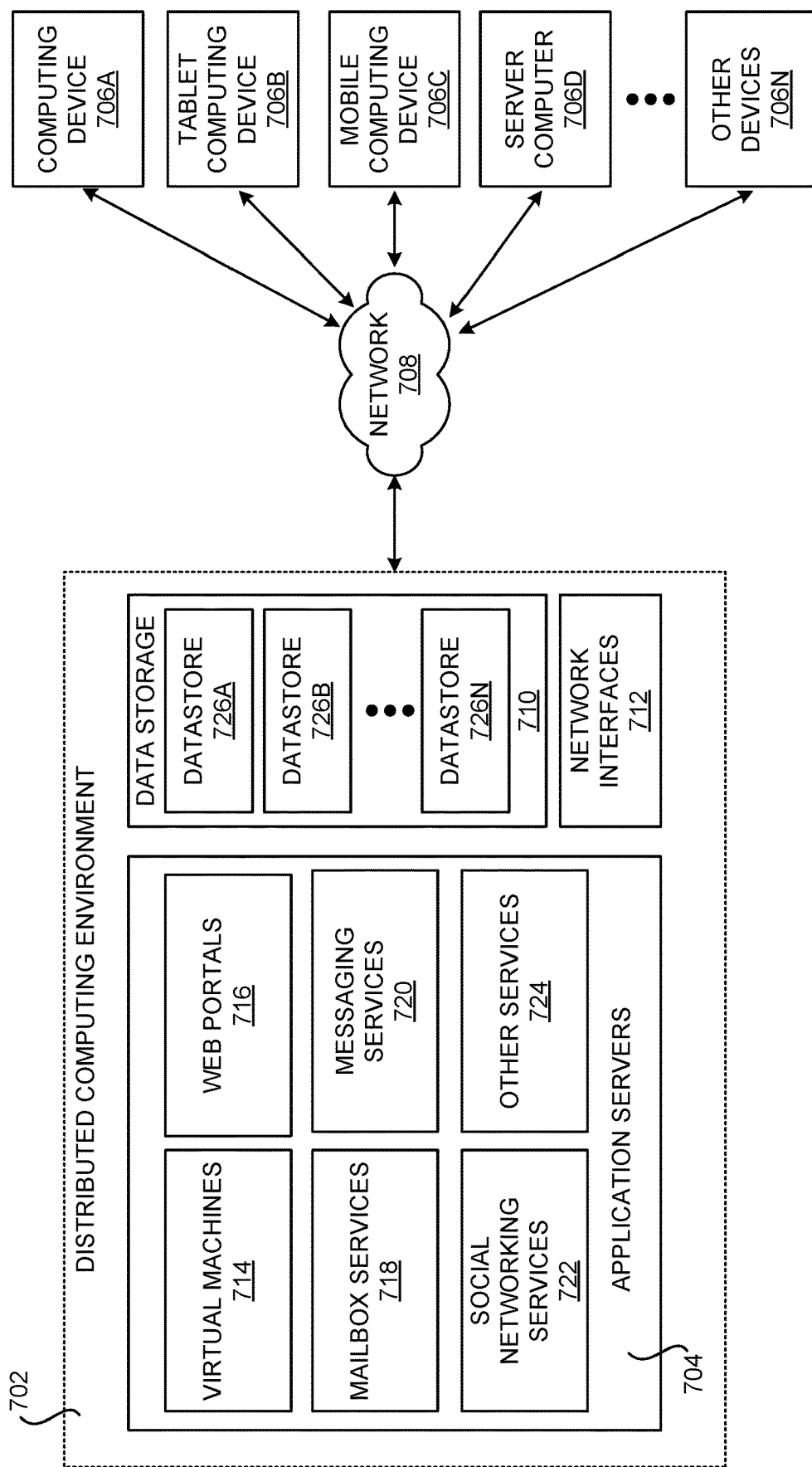
FIG. 7 is a network diagram illustrating a distributed computing environment capable of implementing aspects of the technologies presented herein.

FIG. 7 shows aspects of an illustrative distributed computing environment 702 that can provide cloud sourced resources, such as the resources for proxy service 230 and service provider 120 illustrated in the system 250 of FIG. 2B, in which the software components described herein can be executed. Thus, the distributed computing environment 702 illustrated in FIG. 7 can be used to execute program code capable of providing the functionality described above with respect to FIGS. 1-5 and/or any of the other software components described herein.

According to various implementations, the distributed computing environment 702 operates on, in communication with, or as part of a network 708. One or more client devices 706A-706N (hereinafter referred to collectively and/or generically as "devices 706") can communicate with the distributed computing environment 702 via the network 708 and/or other connections (not illustrated in FIG. 7).

In the illustrated configuration, the devices 706 include: a computing device 706A such as a laptop computer, a desktop computer, or other computing device; a "slate" or tablet computing device ("tablet computing device") 706B; a mobile computing device 706C such as a mobile telephone, a smartphone, or other mobile computing device; a server computer 706D; and/or other devices 706N. It should be understood that any number of devices 706 can communicate with the distributed computing environment 702. Two example computing architectures for the devices 706 are illustrated and described herein with reference to FIGS. 6 and 8. It should be understood that the illustrated client devices 706 and computing architectures illustrated and described herein are illustrative and should not be construed as being limited in any way.

In the illustrated configuration, the distributed computing environment 702 includes application servers 704, data storage 710, and one or more network interfaces 712. According to various implementations, the functionality of the application servers 704 can be provided by one or more server computers that are executing as part of, or in communication with, the network 708. The application servers 704 can host various services such as virtual machines, portals, and/or other resources. In the illustrated configuration, the application servers 704 host one or more virtual machines 714 for hosting applications, such as program components for implementing the functionality described above with regard to FIGS. 1-5. It should be understood that this configuration is illustrative and should not be construed as being limiting in any way. The application servers 704 might also host or provide access to one or more web portals, link pages, websites, and/or other information ("web portals") 716.

According to various implementations, the application servers 704 also include one or more mailbox services 718 and one or more messaging services 720. The mailbox services 718 can include electronic mail ("email") services. The mailbox services 718 can also include various personal information management ("PIM") services including, but not limited to, calendar services, contact management services, collaboration services, and/or other services. The messaging services 720 can include, but are not limited to, instant messaging ("IM") services, chat services, forum services, and/or other communication services.

The application servers 704 can also include one or more social networking services 722. The social networking services 722 can provide various types of social networking services including, but not limited to, services for sharing or posting status updates, instant messages, links, photos, videos, and/or other information, services for commenting or displaying interest in articles, products, blogs, or other resources, and/or other services. In some configurations, the social networking services 722 are provided by or include the FACEBOOK social networking service, the LINKEDIN professional networking service, the FOURSQUARE geographic networking service, and the like. In other configurations, the social networking services 722 are provided by other services, sites, and/or providers that might be referred to as "social networking providers." For example, some websites allow users to interact with one another via email, chat services, and/or other means during various activities and/or contexts such as reading published articles, commenting on goods or services, publishing, collaboration, gaming, and the like. Other services are possible and are contemplated.

The social network services 722 can include commenting, blogging, and/or microblogging services. Examples of such services include, but are not limited to, the YELP commenting service, the KUDZU review service, the OFFICETALK enterprise microblogging service, the TWITTER messaging service, and/or other services. It should be appreciated that the above lists of services are not exhaustive and that numerous additional and/or alternative social networking services 722 are not mentioned herein for the sake of brevity. As such, the configurations described above are illustrative, and should not be construed as being limited in any way.

As also shown in FIG. 7, the application servers 704 can also host other services, applications, portals, and/or other resources ("other services") 724. These services can include, but are not limited to, streaming video services like the NETFLIX streaming video service and productivity services such as the GMAIL email service from GOOGLE INC. It thus can be appreciated that activities performed by users of the distributed computing environment 702 can include various mailbox, messaging, social networking, group conversation, productivity, entertainment, and other types of activities. Use of these services, and others, can be detected and used to customize the operation of a computing device utilizing the technologies disclosed herein.

As mentioned above, the distributed computing environment 702 can include data storage 710. According to various implementations, the functionality of the data storage 710 is provided by one or more databases operating on, or in communication with, the network 708. The functionality of the data storage 710 can also be provided by one or more server computers configured to host data for the distributed computing environment 702. The data storage 710 can include, host, or provide one or more real or virtual datastores 726A-726N (hereinafter referred to collectively and/or generically as "datastores 726"). The datastores 726 are configured to host data used or created by the application servers 704 and/or other data.

The distributed computing environment 702 can communicate with, or be accessed by, the network interfaces 712. The network interfaces 712 can include various types of network hardware and software for supporting communications between two or more computing devices including, but not limited to, the devices 706 and the application servers 704. It should be appreciated that the network interfaces 712 can also be utilized to connect to other types of networks and/or computer systems.

It should be understood that the distributed computing environment 702 described herein can implement any aspects of the software elements described herein with any number of virtual computing resources and/or other distributed computing functionality that can be configured to execute any aspects of the software components disclosed herein. It should also be understood that the devices 706 can also include real or virtual machines including, but not limited to, server computers, web servers, personal computers, gaming consoles or other types of gaming devices, mobile computing devices, smartphones, and/or other devices. As such, various implementations of the technologies disclosed herein enable any device configured to access the distributed computing environment 702 to utilize the functionality described herein.

Figure 8:
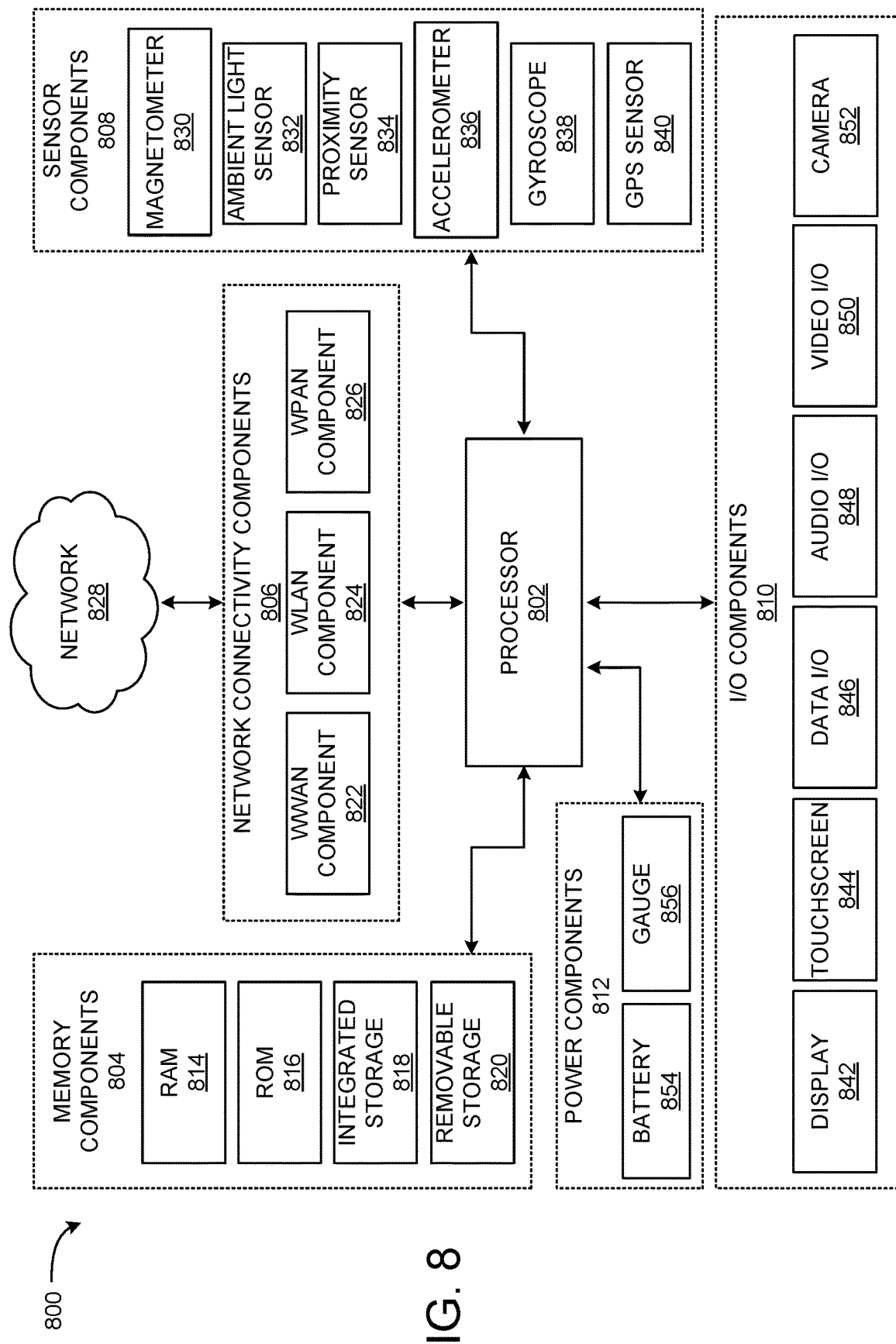
FIG. 8 is a computer architecture diagram illustrating a computing device architecture for a computing device, such as the computing devices shown in FIGS. 1, 2A and 2B, that is capable of implementing aspects of the technologies presented herein.

Turning now to FIG. 8, an illustrative computing device architecture 800 will be described for a computing device, such as the client 102, proxy service 230, and service provider 120 illustrated in the system 250 of FIG. 2B, that is capable of executing the various software components described herein. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like.

The computing device architecture 800 is also applicable to any of the devices 706 shown in FIG. 7. Furthermore, aspects of the computing device architecture 800 are applicable to traditional desktop computers, portable computers (e.g., laptops, notebooks, ultra-portables, and netbooks), server computers, and other computer devices, such as those described herein. For example, the single touch and multi-touch aspects disclosed herein below can be applied to desktop, laptop, convertible, smartphone, or tablet computer devices that utilize a touchscreen or some other touch-enabled device, such as a touch-enabled track pad or touch-enabled mouse. The computing device architecture 800 can also be utilized to implement the client 102, proxy service 230, and service provider 120 illustrated in the system 250 of FIG. 2B and/or other types of computing devices for implementing or consuming the functionality described herein.

The computing device architecture 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individual components illustrated in FIG. 8, the components can be connected electrically in order to interact and carry out device functions. In some configurations, the components are arranged so as to communicate via one or more busses (not shown).

The processor 802 includes one or more CPU cores configured to process data, execute computer executable instructions of one or more application programs and to communicate with other components of the computing device architecture 800 in order to perform various functionality described herein. The processor 802 can be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and engineering computing applications, as well as graphics-intensive computing applications such as high-resolution video (e.g., 720P, 1080P, 4K, and greater), video games, 3D modeling applications, and the like. In some configurations, the processor 802 is configured to communicate with a discrete GPU (not shown). In any case, the CPU and GPU can be configured in accordance with a co-processing CPU/GPU computing model, wherein the sequential part of an application executes on the CPU and the computationally intensive part is accelerated by the GPU.

In some configurations, the processor 802 is, or is included in, a system-on-chip ("SoC") along with one or more of the other components described herein below. For example, the SoC can include the processor 802, a GPU, one or more of the network connectivity components 806, and one or more of the sensor components 808. In some configurations, the processor 802 is fabricated, in part, utilizing a package-on-package ("PoP") integrated circuit packaging technique. Moreover, the processor 802 can be a single core or multi-core processor.

The processor 802 can be created in accordance with an ARM architecture, available for license from ARM HOLDINGS of Cambridge, United Kingdom. Alternatively, the processor 802 can be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a RAM 814, a ROM 816, an integrated storage memory ("integrated storage") 818, and a removable storage memory ("removable storage") 820. In some configurations, the RAM 814 or a portion thereof, the ROM 816 or a portion thereof, and/or some combination of the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 or the removable storage 820.

The integrated storage 818 can include a solid-state memory, a hard disk, or a combination of solid-state memory and a hard disk. The integrated storage 818 can be soldered or otherwise connected to a logic board upon which the processor 802 and other components described herein might also be connected. As such, the integrated storage 818 is integrated in the computing device. The integrated storage 818 can be configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available and shown to a user as a total combined capacity of the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 can be embodied in various memory card formats including, but not limited to, PC card, COMPACTFLASH card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to, the WINDOWS operating system from MICROSOFT CORPORATION, the IOS operating system from APPLE INC. of Cupertino, Calif., and ANDROID operating system from GOOGLE INC. of Mountain View, Calif. Other operating systems can also be utilized.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from a network 828, which can be a WWAN, a WLAN, or a WPAN. Although a single network 828 is illustrated, the network connectivity components 806 can facilitate simultaneous communication with multiple networks. For example, the network connectivity components 806 can facilitate simultaneous communications with multiple networks via one or more of a WWAN, a WLAN, or a WPAN.

The network 828 can be a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX").

Moreover, the network 828 can utilize various channel access methods (which might or might not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 828 can be configured to provide voice and/or data communications with any combination of the above technologies. The network 828 can be configured or adapted to provide voice and/or data communications in accordance with future generation technologies.

In some configurations, the WWAN component 822 is configured to provide dual-multi-mode connectivity to the network 828. For example, the WWAN component 822 can be configured to provide connectivity to the network 828, wherein the network 828 provides service via GSM and UMTS technologies, or via some other combination of technologies. Alternatively, multiple WWAN components 822 can be utilized to perform such functionality, and/or provide additional functionality to support other non-compatible technologies (i.e., incapable of being supported by a single WWAN component). The WWAN component 822 can facilitate similar connectivity to multiple networks (e.g., a UMTS network and an LTE network).

The network 828 can be a WLAN operating in accordance with one or more Institute of Electrical and Electronic Engineers ("IEEE") 104.11 standards, such as IEEE 104.11a, 104.11b, 104.11g, 104.11n, and/or a future 104.11 standard (referred to herein collectively as WI-FI). Draft 104.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 828 via the WI-FI access points. Such connections can be secured via various encryption technologies including, but not limited, WI-FI Protected Access ("WPA"), WPA2, Wired Equivalent Privacy ("WEP"), and the like.

The network 828 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 830, an ambient light sensor 832, a proximity sensor 834, an accelerometer 836, a gyroscope 838, and a Global Positioning System sensor ("GPS sensor") 840. It is contemplated that other sensors, such as, but not limited to, temperature sensors or shock detection sensors, might also be incorporated in the computing device architecture 800.

The magnetometer 830 is configured to measure the strength and direction of a magnetic field. In some configurations, the magnetometer 830 provides measurements to a compass application program stored within one of the memory components 804 in order to provide a user with accurate directions in a frame of reference including the cardinal directions, north, south, east, and west. Similar measurements can be provided to a navigation application program that includes a compass component. Other uses of measurements obtained by the magnetometer 830 are contemplated.

The ambient light sensor 832 is configured to measure ambient light. In some configurations, the ambient light sensor 832 provides measurements to an application program stored within one the memory components 804 in order to automatically adjust the brightness of a display (described below) to compensate for low light and bright light environments. Other uses of measurements obtained by the ambient light sensor 832 are contemplated.

The proximity sensor 834 is configured to detect the presence of an object or thing in proximity to the computing device without direct contact. In some configurations, the proximity sensor 834 detects the presence of a user's body (e.g., the user's face) and provides this information to an application program stored within one of the memory components 804 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 834 are contemplated.

The accelerometer 836 is configured to measure proper acceleration. In some configurations, output from the accelerometer 836 is used by an application program as an input mechanism to control some functionality of the application program. In some configurations, output from the accelerometer 836 is provided to an application program for use in switching between landscape and portrait modes, calculating coordinate acceleration, or detecting a fall. Other uses of the accelerometer 836 are contemplated.

The gyroscope 838 is configured to measure and maintain orientation. In some configurations, output from the gyroscope 838 is used by an application program as an input mechanism to control some functionality of the application program. For example, the gyroscope 838 can be used for accurate recognition of movement within a 3D environment of a video game application or some other application. In some configurations, an application program utilizes output from the gyroscope 838 and the accelerometer 836 to enhance user input operations. Other uses of the gyroscope 838 are contemplated.

The GPS sensor 840 is configured to receive signals from GPS satellites for use in calculating a location. The location calculated by the GPS sensor 840 can be used by any application program that requires or benefits from location information. For example, the location calculated by the GPS sensor 840 can be used with a navigation application program to provide directions from the location to a destination or directions from the destination to the location. Moreover, the GPS sensor 840 can be used to provide location information to an external location-based service, such as E911 service. The GPS sensor 840 can obtain location information generated via WI-FI, WIMAX, and/or cellular triangulation techniques utilizing one or more of the network connectivity components 806 to aid the GPS sensor 840 in obtaining a location fix. The GPS sensor 840 can also be used in Assisted GPS ("A-GPS") systems.

The I/O components 810 include a display 842, a touchscreen 844, a data I/O interface component ("data I/O") 846, an audio I/O interface component ("audio I/O") 848, a video I/O interface component ("video I/O") 850, and a camera 852. In some configurations, the display 842 and the touchscreen 844 are combined. In some configurations two or more of the data I/O component 846, the audio I/O component 848, and the video I/O component 850 are combined. The I/O components 810 can include discrete processors configured to support the various interfaces described below or might include processing functionality built-in to the processor 802.

The display 842 is an output device configured to present information in a visual form. In particular, the display 842 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 842 is a liquid crystal display ("LCD") utilizing any active or passive matrix technology and any backlighting technology (if used). In some configurations, the display 842 is an organic light emitting diode ("OLED") display. Other display types are contemplated.

The touchscreen 844 is an input device configured to detect the presence and location of a touch. The touchscreen 844 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 844 is incorporated on top of the display 842 as a transparent layer to enable a user to use one or more touches to interact with objects or other information presented on the display 842. In other configurations, the touchscreen 844 is a touch pad incorporated on a surface of the computing device that does not include the display 842. For example, the computing device can have a touchscreen incorporated on top of the display 842 and a touch pad on a surface opposite the display 842.

In some configurations, the touchscreen 844 is a single-touch touchscreen. In other configurations, the touchscreen 844 is a multi-touch touchscreen. In some configurations, the touchscreen 844 is configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 844. As such, a developer can create gestures that are specific to a particular application program.

In some configurations, the touchscreen 844 supports a tap gesture in which a user taps the touchscreen 844 once on an item presented on the display 842. The tap gesture can be used for various reasons including, but not limited to, opening or launching whatever the user taps, such as a graphical icon. In some configurations, the touchscreen 844 supports a double tap gesture in which a user taps the touchscreen 844 twice on an item presented on the display 842. The double tap gesture can be used for various reasons including, but not limited to, zooming in or zooming out in stages. In some configurations, the touchscreen 844 supports a tap and hold gesture in which a user taps the touchscreen 844 and maintains contact for at least a pre-defined time. The tap and hold gesture can be used for various reasons including, but not limited to, opening a context-specific menu.

In some configurations, the touchscreen 844 supports a pan gesture in which a user places a finger on the touchscreen 844 and maintains contact with the touchscreen 844 while moving the finger on the touchscreen 844. The pan gesture can be used for various reasons including, but not limited to, moving through screens, images, or menus at a controlled rate. Multiple finger pan gestures are also contemplated. In some configurations, the touchscreen 844 supports a flick gesture in which a user swipes a finger in the direction the user wants the screen to move. The flick gesture can be used for various reasons including, but not limited to, scrolling horizontally or vertically through menus or pages. In some configurations, the touchscreen 844 supports a pinch and stretch gesture in which a user makes a pinching motion with two fingers (e.g., thumb and forefinger) on the touchscreen 844 or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as toes or objects such as styluses can be used to interact with the touchscreen 844. As such, the above gestures should be understood as being illustrative and should not be construed as being limiting in any way.

The data I/O interface component 846 is configured to facilitate input of data to the computing device and output of data from the computing device. In some configurations, the data I/O interface component 846 includes a connector configured to provide wired connectivity between the computing device and a computer system, for example, for synchronization operation purposes. The connector can be a proprietary connector or a standardized connector such as USB, micro-USB, mini-USB, USB-C, or the like. In some configurations, the connector is a dock connector for docking the computing device with another device such as a docking station, audio device (e.g., a digital music player), or video device.

The audio I/O interface component 848 is configured to provide audio input and/or output capabilities to the computing device. In some configurations, the audio I/O interface component 848 includes a microphone configured to collect audio signals. In some configurations, the audio I/O interface component 848 includes a headphone jack configured to provide connectivity for headphones or other external speakers. In some configurations, the audio interface component 848 includes a speaker for the output of audio signals. In some configurations, the audio I/O interface component 848 includes an optical audio cable out.

The video I/O interface component 850 is configured to provide video input and/or output capabilities to the computing device. In some configurations, the video I/O interface component 850 includes a video connector configured to receive video as input from another device (e.g., a video media player such as a DVD or BLU-RAY player) or send video as output to another device (e.g., a monitor, a television, or some other external display). In some configurations, the video I/O interface component 850 includes a High-Definition Multimedia Interface ("HDMI"), mini-HDMI, micro-HDMI, DisplayPort, or proprietary connector to input/output video content. In some configurations, the video I/O interface component 850 or portions thereof is combined with the audio I/O interface component 848 or portions thereof.

The camera 852 can be configured to capture still images and/or video. The camera 852 can utilize a charge coupled device ("CCD") or a complementary metal oxide semiconductor ("CMOS") image sensor to capture images. In some configurations, the camera 852 includes a flash to aid in taking pictures in low-light environments. Settings for the camera 852 can be implemented as hardware or software buttons.

Although not illustrated, one or more hardware buttons can also be included in the computing device architecture 800. The hardware buttons can be used for controlling some operational aspect of the computing device. The hardware buttons can be dedicated buttons or multi-use buttons. The hardware buttons can be mechanical or sensor-based.

The illustrated power components 812 include one or more batteries 854, which can be connected to a battery gauge 856. The batteries 854 can be rechargeable or disposable. Rechargeable battery types include, but are not limited to, lithium polymer, lithium ion, nickel cadmium, and nickel metal hydride. Each of the batteries 854 can be made of one or more cells.

The battery gauge 856 can be configured to measure battery parameters such as current, voltage, and temperature. In some configurations, the battery gauge 856 is configured to measure the effect of a battery's discharge rate, temperature, age and other factors to predict remaining life within a certain percentage of error. In some configurations, the battery gauge 856 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 812 can also include a power connector (not shown), which can be combined with one or more of the aforementioned I/O components 810. The power components 812 can interface with an external power system or charging equipment via a power I/O component 810. Other configurations can also be utilized.

The disclosure presented herein also encompasses the subject matter set forth in the following clauses:

Clause 1. A computer-implemented method for session control in a proxy service for client-side applications in a client, the method comprising: receiving a service request from a client; sending the service request to a service provider; receiving a service response from the service provider that includes a document responsive to the service request; injecting into the document event monitoring code for monitoring user actions on the client; sending the service response with the document and event monitoring code to the client; intercepting by the event monitoring code a user request for action for the document on the client; sending a query message to the proxy service with data identifying the user request for action and a client-side application used by the user; receiving by the proxy service the query message with data identifying the user request for action and the client-side application used by the user; searching for access data pertaining to the document; if access data pertaining to the document is found that indicates that the user request for action and the client-side application used by the user is permitted, then sending a query response to the event monitoring code with information indicating that the user request for action is permitted; if no access data pertaining to the document is found that indicates that the user request for action and the client-side application used by the user is permitted, sending the query response to the event monitoring code with information indicating that the user request for action is not permitted; receiving in the event monitoring code the query response from the proxy service; if the query response indicates that the user request for action is permitted, allowing normal execute flow for the user request for action; and if the query response indicates that the user request for action is not permitted, blocking execution flow for the user request for action.

Clause 2. The computer-implemented method of Clause 1, where the method includes: if no access data pertaining to the document is found that indicates that the user request for action and the client-side application used by the user are permitted, then perform at least one of: notifying the user that the user request for action is denied; and obscuring from the user at least a portion of content in the document in the client.

Clause 3. The computer-implemented method of Clause 1, where the user request for action comprises at least one of a navigation action, a print action, a read action, an edit action, and a send action.

Clause 4. The computer-implemented method of Clause 1, where the access data comprises an entry corresponding to each of one or more client-side applications with definitions for permitted user actions for each application.

Clause 5. The computer-implemented method of Clause 1, where: the step of injecting into the document event monitoring code for monitoring user actions on the client includes: adding an event listener before and after a monitored action; and the step of blocking execution flow for the user request for action includes: adding a text element with predetermined text to the Document Object Model (DOM) for the document; and adding a Cascading Style Sheet (CSS) element to the DOM with media that applies to the user request for action that is configured to hide at least one element of the document.

Clause 6. The computer-implemented method of Clause 1, where: the step of injecting into the document event monitoring code for monitoring user actions on the client comprises: adding code for checking whether a navigation Universal Resource Locator (URL) to which a user is navigating matches a client-side application URL scheme; and the step of blocking execution flow for the user request for action comprises: replacing the navigation URL with a dummy URL that maintains a user in a current view page for the document.

Clause 7. A proxy system for session control of client-side applications in a client, the system comprising: one or more processors; and one or more memory devices in communication with the one or more processors, the memory devices having computer-readable instructions stored thereupon that, when executed by the processors, cause the processors to perform a method comprising: receiving a service request from a client; sending the service request to a service provider; receiving a service response from the service provider that includes a document responsive to the service request; injecting into the document event monitoring code for monitoring user actions on the client; sending the service response with the document and event monitoring code to the client; receiving a query message from the event monitoring code with data identifying a user request for action and the client-side application used by the user; searching for access data pertaining to the document; if access data pertaining to the document is found that indicates that the user request for action and the client-side application used by the user is permitted, then sending a query response to the event monitoring code with information indicating that the user request for action is permitted; and if no access data pertaining to the document is found that indicates that the user request for action and the client-side application used by the user is permitted, sending the query response to the event monitoring code with information indicating that the user request for action is not permitted.

Clause 8. The proxy system of Clause 7, where the event monitoring code is configured to operate to perform at least one of: generate a message for display on a user interface of the client indicating that the user request is denied if no access data pertaining to the document is found that indicates that the application and user request for action is not permitted; and obscure at least a portion of content in the document in the client if no access data pertaining to the document is found that indicates that the application and user request for action is not permitted.

Clause 9. The proxy system of Clause 7, where the user request for action comprises at least one of a navigation action, a print action, a read action, an edit action, and a send action.

Clause 10. The proxy system of Clause 7, where the access data comprises an entry corresponding to each of one or more applications with definitions for permitted user actions for each application.

Clause 11. The proxy system of Clause 7, where the event monitoring code for monitoring user actions for the document on the client comprises code for: intercepting a user request for action for the document on the client; sending the query message to the proxy service with data identifying the user request for action and a client-side application used by the user; receiving the query response from the proxy service; if the query response indicates that the user request for action is permitted, allowing normal execute flow for the user request for action; and if the query response indicates that the user request for action is not permitted, blocking execution flow for the user request for action.

Clause 12. The proxy system of Clause 11, where: the event monitoring code for monitoring user actions on the client comprises an event listener before and after a monitored action; and the event monitoring code for blocking execution flow for the user request for action comprises code for: adding a text element with predetermined text to the Document Object Model (DOM) for the document; and adding a Cascading Style Sheet (CSS) element to the DOM with media that applies to the user request for action that is configured to hide at least one element of the document.

Clause 13. The proxy system of Clause 11, where: the event monitoring code for monitoring user actions on the client comprises: code for checking whether a navigation Universal Resource Locator (URL) to which a user is navigating matches a client-side application URL scheme; and the event monitoring code for blocking execution flow for the user request for action comprises: code for replacing the navigation URL with a dummy URL that maintains a user in a current view page for the document.

Clause 14. One or more computer storage media having computer executable instructions stored thereon which, when executed by one or more processors, cause the processors to execute a method in a proxy service for session control of client-side applications in a client, the method comprising: receiving a service request from a client; sending the service request to a service provider; receiving a service response from the service provider that includes a document responsive to the service request; injecting into the document event monitoring code for monitoring user actions on the client; sending the service response with the document and event monitoring code to the client; receiving a query message from the event monitoring code with data identifying a user request for action and the client-side application used by the user; searching for access data pertaining to the document; if access data pertaining to the document is found that indicates that the user request for action and the client-side application used by the user is permitted, then sending a query response to the event monitoring code with information indicating that the user request for action is permitted; and if no access data pertaining to the document is found that indicates that the user request for action and the client-side application used by the user is permitted, sending the query response to the event monitoring code with information indicating that the user request for action is not permitted.

Clause 15. The one or more computer storage media of Clause 14, where the event monitoring code includes instructions to perform at least one of: generate a message for display on a user interface of the client indicating that the user request is denied if no access data pertaining to the document is found that indicates that the application and user request for action is permitted; and obscure at least a portion of content in the document in the client if no access data pertaining to the document is found that indicates that the application and user request for action is permitted.

Clause 16. The one or more computer storage media of Clause 14, where the user request for action comprises at least one of a navigation action, a print action, a read action, an edit action, and a send action.

Clause 17. The one or more computer storage media of Clause 14, where the access data comprises an entry corresponding to each of one or more applications with definitions for permitted user actions for each application.

Clause 18. The one or more computer storage media of Clause 14, where the event monitoring code includes instructions for: intercepting a user request for action for the document on the client; sending the query message to the proxy service with data identifying the user request for action and a client-side application used by the user; receiving the query response from the proxy service; if the query response indicates that the user request for action is permitted, allowing normal execute flow for the user request for action; and if the query response indicates that the user request for action is not permitted, blocking execution flow for the user request for action.

Clause 19. The one or more computer storage media of Clause 18, where: the event monitoring code for monitoring user actions on the client comprises code for an event listener before and after a monitored action; and the event monitoring code for blocking execution flow for the user request for action comprises code for: adding a text element with predetermined text to the Document Object Model (DOM) for the document; and adding a Cascading Style Sheet (CS S) element to the DOM with media that applies to the user request for action that is configured to hide at least one element of the document.

Clause 20. The one or more computer storage media of Clause 18, where: the event monitoring code for monitoring user actions on the client comprises: code for checking whether a navigation Universal Resource Locator (URL) to which a user is navigating matches a client-side application URL scheme; and the event monitoring code for blocking execution flow for the user request for action comprises: code for replacing the navigation URL with a dummy URL that maintains a user in a current view page for the document.

Based on the foregoing, it should be appreciated that the disclosed technology enables session control in a proxy service for client-side applications, which improves security by preventing user actions that expose documents and other content to risk.

Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method for session control in a proxy service for client-side applications in a client, the method comprising:
receiving a service request from a client;
sending the service request to a service provider;
receiving a service response from the service provider that includes a document responsive to the service request;
injecting into the document event monitoring code for monitoring user actions on the client;
sending the service response with the document and event monitoring code to the client;
intercepting by the event monitoring code a user request for action for the document on the client;
sending a query message to the proxy service with data identifying the user request for action and a client-side application used by the user;
receiving by the proxy service the query message with the data identifying the user request for action and the client-side application used by the user;
searching for access data pertaining to the document;
if access data pertaining to the document is found that indicates that the user request for action and the client-side application used by the user is permitted, then sending a query response to the event monitoring code with information indicating that the user request for action is permitted;
if no access data pertaining to the document is found that indicates that the user request for action and the client-side application used by the user is permitted, sending the query response to the event monitoring code with information indicating that the user request for action is not permitted;
receiving in the event monitoring code the query response from the proxy service;
if the query response indicates that the user request for action is permitted, allowing normal execute flow for the user request for action; and if the query response indicates that the user request for action is not permitted, blocking execution flow for the user request for action.

2. The computer-implemented method of claim 1, where the method includes:
if no access data pertaining to the document is found that indicates that the user request for action and the client-side application used by the user are permitted, then perform at least one of:
notifying the user that the user request for action is denied; and
obscuring from the user at least a portion of content in the document in the client.

3. The computer-implemented method of claim 1, where the user request for action comprises at least one of a navigation action, a print action, a read action, an edit action, and a send action.

4. The computer-implemented method of claim 1, where the access data comprises an entry corresponding to each of one or more client-side applications with definitions for permitted user actions for each application.

5. The computer-implemented method of claim 1, where:
the step of injecting into the document event monitoring code for monitoring user actions on the client includes:
adding an event listener before and after a monitored action; and
the step of blocking execution flow for the user request for action includes:
adding a text element with predetermined text to the Document Object Model (DOM) for the document; and
adding a Cascading Style Sheet (CS S) element to the DOM with media that applies to the user request for action that is configured to hide at least one element of the document.

6. The computer-implemented method of claim 1, where:
the step of injecting into the document event monitoring code for monitoring user actions on the client comprises:
adding code for checking whether a navigation Universal Resource Locator (URL) to which a user is navigating matches a client-side application URL scheme; and
the step of blocking execution flow for the user request for action comprises:
replacing the navigation URL with a dummy URL that maintains a user in a current view page for the document.

7. A proxy system for session control of client-side applications in a client, the system comprising:
one or more processors; and
one or more memory devices in communication with the one or more processors, the memory devices having computer-readable instructions stored thereupon that, when executed by the processors, cause the processors to perform a method comprising:
receiving a service request from the client;
sending the service request to a service provider;
receiving a service response from the service provider that includes a document responsive to the service request;
injecting into the document event monitoring code for monitoring user actions on the client;
sending the service response with the document and the event monitoring code to the client;
intercepting a user request for action for the document on the client receiving a query message from the event monitoring code with data identifying the user request for action and the client-side application used by a user;
sending, using the event monitoring code, the query message to a proxy service with the data identifying the user request for action and the client-side application used by the user;
searching the proxy service, using the data identifying the user request for action and the client-side application used by the user, for access data pertaining to the document;
if access data pertaining to the document is found that indicates that the user request for action and the client-side application used by the user is permitted, then sending, using the proxy service, a query response to the event monitoring code with information indicating that the user request for action is permitted; and
if no access data pertaining to the document is found that indicates that the user request for action and the client-side application used by the user is permitted, sending, using the proxy service, the query response to the event monitoring code with information indicating that the user request for action is not permitted.

8. The proxy system of claim 7, where the event monitoring code is configured to operate to perform at least one of:
generate a message for display on a user interface of the client indicating that the user request is denied if no access data pertaining to the document is found that indicates that the application and user request for action is not permitted; and
obscure at least a portion of content in the document in the client if no access data pertaining to the document is found that indicates that the application and user request for action is not permitted.

9. The proxy system of claim 7, where the user request for action comprises at least one of a navigation action, a print action, a read action, an edit action, and a send action.

10. The proxy system of claim 7, where the access data comprises an entry corresponding to each of one or more applications with definitions for permitted user actions for each application.

11. The proxy system of claim 7, where the event monitoring code for monitoring user actions for the document on the client comprises code for:
receiving the query response from the proxy service;
if the query response indicates that the user request for action is permitted, allowing normal execute flow for the user request for action; and
if the query response indicates that the user request for action is not permitted, blocking execution flow for the user request for action.

12. The proxy system of claim 11, where:
the event monitoring code for monitoring user actions on the client comprises an event listener before and after a monitored action; and
the event monitoring code for blocking execution flow for the user request for action comprises code for:
adding a text element with predetermined text to the Document Object Model (DOM) for the document; and
adding a Cascading Style Sheet (CS S) element to the DOM with media that applies to the user request for action that is configured to hide at least one element of the document.

13. The proxy system of claim 11, where:
the event monitoring code for monitoring user actions on the client comprises:
code for checking whether a navigation Universal Resource Locator (URL) to which a user is navigating matches a client-side application URL scheme; and
the event monitoring code for blocking execution flow for the user request for action comprises:
code for replacing the navigation URL with a dummy URL that maintains a user in a current view page for the document.

14. One or more computer storage media having computer executable instructions stored thereon which, when executed by one or more processors, cause the processors to execute a method in a proxy service for session control of client-side applications in a client, the method comprising:
receiving a service request from the client;
sending the service request to a service provider;
receiving a service response from the service provider that includes a document responsive to the service request;
injecting into the document event monitoring code for monitoring user actions on the client;
sending the service response with the document and the event monitoring code to the client;
intercepting a user request for action for the document on the client;
receiving a query message from the event monitoring code with data identifying the user request for action and the client-side application used by a user;
sending, using the event monitoring code, the query message to the proxy service with the data identifying the user request for action and the client-side application used by the user;
searching the proxy service, using the data identifying the user request for action and the client-side application used by the user, for access data pertaining to the document;
if access data pertaining to the document is found that indicates that the user request for action and the client-side application used by the user is permitted, then sending, using the proxy service, a query response to the event monitoring code with information indicating that the user request for action is permitted; and
if no access data pertaining to the document is found that indicates that the user request for action and the client-side application used by the user is permitted, sending, using the proxy service, the query response to the event monitoring code with information indicating that the user request for action is not permitted.

15. The one or more computer storage media of claim 14, where the event monitoring code includes instructions to perform at least one of:
generate a message for display on a user interface of the client indicating that the user request is denied if no access data pertaining to the document is found that indicates that the application and user request for action is permitted; and
obscure at least a portion of content in the document in the client if no access data pertaining to the document is found that indicates that the application and user request for action is permitted.

16. The one or more computer storage media of claim 14, where the user request for action comprises at least one of a navigation action, a print action, a read action, an edit action, and a send action.

17. The one or more computer storage media of claim 14, where the access data comprises an entry corresponding to each of one or more applications with definitions for permitted user actions for each application.

18. The one or more computer storage media of claim 14, where the event monitoring code includes instructions for:
receiving the query response from the proxy service;
if the query response indicates that the user request for action is permitted, allowing normal execute flow for the user request for action; and
if the query response indicates that the user request for action is not permitted, blocking execution flow for the user request for action.

19. The one or more computer storage media of claim 18, where:
the event monitoring code for monitoring user actions on the client comprises code for an event listener before and after a monitored action; and
the event monitoring code for blocking execution flow for the user request for action comprises code for:
adding a text element with predetermined text to the Document Object Model (DOM) for the document; and
adding a Cascading Style Sheet (CS S) element to the DOM with media that applies to the user request for action that is configured to hide at least one element of the document.

20. The one or more computer storage media of claim 18, where:
the event monitoring code for monitoring user actions on the client comprises:
code for checking whether a navigation Universal Resource Locator (URL) to which a user is navigating matches a client-side application URL scheme; and
the event monitoring code for blocking execution flow for the user request for action comprises:
code for replacing the navigation URL with a dummy URL that maintains a user in a current view page for the document.

* * * * *